(12) United States Patent
Bacon, Jr.

(10) Patent No.: US 7,347,571 B2
(45) Date of Patent: Mar. 25, 2008

(54) PRISMATIC RETROREFLECTIVE ARTICLE WITH FLUORINE- OR SILICON-CONTAINING PRISMS

(75) Inventor: Chester A. Bacon, Jr., Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/319,965

(22) Filed: Dec. 28, 2005

(65) Prior Publication Data

US 2006/0158736 A1 Jul. 20, 2006

Related U.S. Application Data

(60) Provisional application No. 60/639,713, filed on Dec. 28, 2004.

(51) Int. Cl.
*G02B 5/124* (2006.01)
(52) U.S. Cl. .................................................. 359/530
(58) Field of Classification Search .............. 359/529, 359/530–533, 202, 203, 291, 294; 428/116, 428/142, 183, 195.1, 913, 913.3
See application file for complete search history.

(56) References Cited

U.S. PATENT DOCUMENTS

| | | | |
|---|---|---|---|
| 3,684,348 A | 8/1972 | Rowland |
| 3,689,346 A | 9/1972 | Rowland |
| 3,712,706 A | 1/1973 | Stamm |
| 3,811,983 A | 5/1974 | Rowland |
| 3,817,596 A | 6/1974 | Tanaka |
| 3,830,682 A | 8/1974 | Rowland |
| 3,975,083 A | 8/1976 | Rowland |
| 4,025,159 A | 5/1977 | McGrath |
| 4,202,600 A | 5/1980 | Burke et al. |
| 4,243,618 A | 1/1981 | Van Arnam |
| 4,332,847 A | 6/1982 | Rowland |
| 4,349,598 A | 9/1982 | White |
| 4,576,850 A | 3/1986 | Martens |
| 4,588,258 A | 5/1986 | Hoopman |
| 4,609,587 A | 9/1986 | Giordano et al. |
| 4,618,518 A | 10/1986 | Pricone et al. |

(Continued)

FOREIGN PATENT DOCUMENTS

JP 08-309929 11/1996

(Continued)

OTHER PUBLICATIONS

Bacon et al., U.S. Appl. No. 11/023,857, "Prismatic Retroreflective Article and Method", filed Dec. 28, 2004.

*Primary Examiner*—Stephone B. Allen
*Assistant Examiner*—Jennifer L Doak
(74) *Attorney, Agent, or Firm*—Nicole J. Einerson

(57) ABSTRACT

A prismatic retroreflective article comprising a transparent polymeric body portion having an elastic modulus less than about $13 \times 10^8$ pascals, and a layer of internally reflecting open air-exposed cube-corner optical elements having an elastic modulus greater than about $14 \times 10^8$ pascals and comprising a polymer having covalently-bound fluorine or silicon. The traditionally-employed rear cover film may be eliminated (thereby reducing cost, weight, stiffness and retroreflectivity loss due to seal leg formation), and retroreflectivity under wet conditions, dirty conditions, or both wet and dirty conditions can be at least partially maintained.

19 Claims, 3 Drawing Sheets

U.S. PATENT DOCUMENTS

| | | |
|---|---|---|
| 4,668,558 A | 5/1987 | Barber |
| 4,672,089 A | 6/1987 | Pricone et al. |
| 4,722,515 A | 2/1988 | Ham |
| 4,755,425 A | 7/1988 | Huang |
| 4,756,931 A | 7/1988 | Giordano et al. |
| 4,775,219 A | 10/1988 | Appeldorn et al. |
| 4,801,193 A | 1/1989 | Martin |
| 4,842,893 A | 6/1989 | Yializis et al. |
| 4,852,885 A | 8/1989 | Baratpour et al. |
| 4,895,428 A | 1/1990 | Nelson et al. |
| 4,938,563 A | 7/1990 | Nelson et al. |
| 4,954,371 A | 9/1990 | Yializis |
| 5,041,304 A | 8/1991 | Kusano et al. |
| 5,069,577 A | 12/1991 | Murphy |
| 5,073,404 A | 12/1991 | Huang |
| 5,097,800 A | 3/1992 | Shaw et al. |
| 5,117,304 A * | 5/1992 | Huang et al. ............... 359/529 |
| 5,138,488 A | 8/1992 | Szczech |
| 5,200,262 A | 4/1993 | Li |
| 5,213,872 A | 5/1993 | Pricone et al. |
| 5,229,882 A | 7/1993 | Rowland |
| 5,236,751 A | 8/1993 | Martin et al. |
| 5,264,063 A | 11/1993 | Martin |
| 5,324,566 A | 6/1994 | Ogawa et al. |
| 5,376,431 A | 12/1994 | Rowland |
| 5,395,644 A | 3/1995 | Affinito |
| 5,415,911 A | 5/1995 | Zampa et al. |
| 5,450,235 A | 9/1995 | Smith et al. |
| 5,491,586 A | 2/1996 | Phillips |
| 5,508,084 A | 4/1996 | Reeves et al. |
| 5,512,219 A | 4/1996 | Rowland et al. |
| 5,557,836 A | 9/1996 | Smith et al. |
| 5,558,740 A | 9/1996 | Bernard et al. |
| 5,559,634 A | 9/1996 | Weber |
| 5,564,870 A | 10/1996 | Benson et al. |
| 5,592,330 A | 1/1997 | Bernard |
| 5,600,484 A | 2/1997 | Benson et al. |
| 5,614,286 A | 3/1997 | Bacon, Jr. et al. |
| 5,620,775 A * | 4/1997 | LaPerre ............... 428/149 |
| 5,637,173 A | 6/1997 | Martin et al. |
| 5,648,145 A | 7/1997 | Martin |
| 5,691,846 A | 11/1997 | Benson, Jr. et al. |
| 5,706,132 A * | 1/1998 | Nestegard et al. ......... 359/529 |
| 5,770,124 A | 6/1998 | Marecki et al. |
| 5,812,317 A | 9/1998 | Billingsley et al. |
| 5,831,766 A | 11/1998 | Martin et al. |
| 5,851,674 A | 12/1998 | Pellerite et al. |
| 5,888,594 A | 3/1999 | David et al. |
| 5,888,618 A | 3/1999 | Martin |
| 5,930,041 A | 7/1999 | Thielman |
| 5,939,182 A | 8/1999 | Huang et al. |
| 5,948,166 A | 9/1999 | David et al. |
| 6,015,214 A | 1/2000 | Heenan et al. |
| 6,127,020 A | 10/2000 | Bacon, Jr. et al. |
| 6,132,861 A | 10/2000 | Kang et al. |
| 6,172,810 B1 | 1/2001 | Fleming et al. |
| 6,191,200 B1 | 2/2001 | Phillips |
| 6,224,219 B1 | 5/2001 | Fleming et al. |
| 6,228,434 B1 | 5/2001 | Affinito |
| 6,243,112 B1 | 6/2001 | Kuhman et al. |
| 6,243,201 B1 | 6/2001 | Fleming et al. |
| 6,245,833 B1 | 6/2001 | Kang et al. |
| 6,258,443 B1 | 7/2001 | Nilsen et al. |
| 6,265,061 B1 | 7/2001 | Kang et al. |
| 6,274,221 B2 | 8/2001 | Smith et al. |
| 6,277,485 B1 | 8/2001 | Invie et al. |
| 6,350,034 B1 | 2/2002 | Fleming et al. |
| 6,350,035 B1 | 2/2002 | Smith et al. |
| 6,386,699 B1 | 5/2002 | Ylitalo et al. |
| 6,440,550 B1 | 8/2002 | Hacker |
| 6,444,275 B1 | 9/2002 | Kuhman et al. |
| 6,461,003 B1 | 10/2002 | Neudeck |
| 6,503,564 B1 | 1/2003 | Fleming et al. |
| 6,541,591 B2 | 4/2003 | Olson et al. |
| 6,582,759 B1 | 6/2003 | Qiu et al. |
| 6,590,711 B1 | 7/2003 | Gardner et al. |
| 6,632,508 B1 | 10/2003 | Pellerite et al. |
| 6,649,249 B1 | 11/2003 | Engle et al. |
| 6,660,389 B2 | 12/2003 | Liu et al. |
| 6,664,354 B2 | 12/2003 | Savu et al. |
| 6,685,323 B1 | 2/2004 | Mimura et al. |
| 6,734,227 B2 | 5/2004 | Jing et al. |
| 6,802,616 B2 | 10/2004 | Mimura |
| 6,811,829 B2 | 11/2004 | Affinito et al. |
| 6,815,040 B2 | 11/2004 | Pellerite et al. |
| 6,815,043 B2 | 11/2004 | Fleming et al. |
| 6,817,724 B2 | 11/2004 | Mimura et al. |
| 2003/0001931 A1 | 1/2003 | Isono |
| 2003/0134515 A1 | 7/2003 | David et al. |
| 2003/0134949 A1 | 7/2003 | Brown |
| 2003/0170426 A1 | 9/2003 | Thielman |
| 2003/0198814 A1 | 10/2003 | Khieu et al. |
| 2003/0203186 A1 | 10/2003 | Jing et al. |
| 2003/0235677 A1 | 12/2003 | Hanschen et al. |
| 2003/0235678 A1 | 12/2003 | Graham et al. |
| 2004/0130057 A1 | 7/2004 | Mehrabi et al. |
| 2004/0191481 A1 | 9/2004 | Erb et al. |
| 2004/0229014 A1 | 11/2004 | Schulz et al. |
| 2004/0229018 A1 | 11/2004 | Graham et al. |

FOREIGN PATENT DOCUMENTS

| | | |
|---|---|---|
| JP | 2000-028811 | 1/2000 |
| WO | WO 97/31357 | 8/1997 |
| WO | WO 99/57185 | 11/1999 |
| WO | WO 00/50931 | 8/2000 |
| WO | WO 02/099476 A2 | 12/2002 |
| WO | WO 02/099476 A3 | 12/2002 |

* cited by examiner

PRISMATIC RETROREFLECTIVE ARTICLE WITH FLUORINE- OR SILICON-CONTAINING PRISMS

This application claims the benefit of U.S. Provisional Patent Application No. 60/639,713, filed Dec. 28, 2004.

FIELD OF THE INVENTION

This disclosure relates to prismatic retroreflective articles for use in applications including footwear, apparel, signage and pavement markings.

BACKGROUND

Prismatic retroreflective articles typically employ a multitude of cube-corner optical elements to retroreflect incident light. The article typically is transparent with a smooth front surface and a rear surface from which the cube-corner elements project. Incident light enters the article at a front surface, passes through the article, is internally reflected by the cube-corner element facets, returns through the article and subsequently exits the front surface and returns towards the light source. Reflection at the cube-corner facets can occur by total internal reflection when the cube-corner elements are encased in a lower refractive index media (e.g., air), or by specular reflection when the cube-corner elements are coated with a suitably reflective structure such as a vapor deposited aluminum coating or a refractive index-mismatched multilayer thin film coating. Various prismatic retroreflective articles and their manufacture are mentioned or disclosed in, for example, U.S. Pat. Nos. 3,684,348, 3,689,346, 3,712,706, 3,811,983, 3,817,596, 3,830,682, 3,975,083, 4,025,159, 4,202,600, 4,243,618, 4,332,847, 4,349,598, 4,668,558, 4,576,850, 4,588,258, 4,618,518, 4,672,089, 4,775,219, 4,801,193, 4,895,428, 4,938,563, 5,069,577, 5,138,488, 5,213,872, 5,229,882, 5,236,751, 5,264,063, 5,376,431, 5,415,911, 5,450,235; 5,491,586, 5,512,219, 5,557,836, 5,558,740, 5,564,870, 5,592,330, 5,600,484, 5,614,286, 5,637,173, 5,648,145, 5,691,846, 5,831,766, 5,888,618, 5,930,041, 5,939,182, 6,015,214, 6,132,861, 6,172,810 B1, 6,191,200 B1, 6,258,443 B1, 6,265,061 B1, 6,274,221 B2, 6,350,035 B1, 6,503,564 B1, 6,685,323 B1, 6,802,616 B2, 6,815,043 B2 and 6,817,724 B2; in U.S. Patent Application Publication Nos. US 2003/0170426 A1 and US 2003/0198814 A1; and in International Application No. WO 97/31357.

Various other articles having microstructured layers or regions are mentioned or disclosed in, for example, U.S. Pat. Nos. 4,609,587, 609,587, 4,755,425, 5,073,404, 5,508,084, 5,559,634, 5,812,317, 6,127,020, 6,386,699 B1, 6,541,591 B2, 6,582,759 B1, 6,590,711 B1, 6,649,249 B1, 6,632,508 B1, 6,660,389 B2, 6,734,227 B2 and 6,815,040 B2; in U.S. Patent Application Publication Nos. US 2003/0134949 A1, US 2003/0203186 A1 and US 2003/0235678 A1; in International Application No. WO 99/57185; and in Japanese Published Patent Application No. 08-309929.

SUMMARY OF THE INVENTION

For prismatic retroreflective articles in which the cube-corner elements are encased in a lower refractive index media, a rear cover film or other generally impermeable structure usually is sealed or otherwise adhered to some of the cube-corner elements, leaving the remaining cube-corner elements encased in the media inside chambers or cells formed by the cube-corner elements, the rear cover film and the sealing structure. For example, FIG. 4 shows a prior art prismatic retroreflective article 150 having front surface 152, body portion 154, air-encased cube-corner elements 156 and rear cover film 158. Rear cover film 158 is thermally welded to cube-corner elements 160 at seal legs 162. Air in sealed cell or chamber 164 provides a lower refractive index media interface at the air-encased cube-corner elements and permits total internal reflection to take place in cube-corner elements 156 at facets such as facets 166 and 168. The cells 164 and rear cover film 158 protect the cube-corner elements from moisture, dirt or other contaminants and help maintain retroreflectivity. However, rear cover film 158 significantly increases the weight, cost and stiffness of article 150, and the seal legs 162 reduce the number of cube-corner elements available for retroreflection.

In embodiments where flexibility is desired (e.g., for reflective footwear or apparel applications or for roll-up signs), body portion 154 and rear cover film 158 can be made from a film that is relatively soft and flexible in comparison to the cube-corner element material. However, even when rear cover film 158 is fairly flexible, its presence can significantly increase article 150's overall stiffness.

Rear cover film 158 may be eliminated. However, the resulting retroreflective article can lose most or all of its retroreflectivity when the exposed cube-corner elements become wet or soiled. This can present particular problems in outdoor, athletic apparel, fire safety and underwater applications.

By forming a prismatic retroreflective article from a lower modulus transparent body portion and from higher modulus open air-exposed internally reflecting cube-corner optical elements formed at least partly from a polymer having covalently-bound fluorine or silicon, a flexible article may be formed, the rear cover film may be eliminated (thereby reducing cost, weight, stiffness and retroreflectivity loss due to seal leg formation), and retroreflectivity under wet conditions, dirty conditions, or both wet and dirty conditions can be at least partially maintained. Using a lower modulus transparent body portion and higher modulus cube-corner elements permits the properties of the body portion and cube-corner elements to be individually optimized for their respective functions in the finished retroreflective article. Articles made by molding cube-corner optical elements formed at least partly from a polymer having covalently-bound fluorine or silicon may cause less mold contamination than might be observed if the article was made by molding cube-corner optical elements containing mobile species such as fluorosurfactants. Articles made from cube-corner optical elements formed at least partly from a polymer having covalently-bound fluorine or silicon may offer better durability than might be provided by merely applying a surface treatment to the exposed cube-corner facets. The invention thus provides in one aspect a prismatic retroreflective article comprising a transparent polymeric body portion having an elastic modulus less than about $13 \times 10^8$ pascals, and a layer of internally reflecting open air-exposed cube-corner optical elements having an elastic modulus greater than about $14 \times 10^8$ pascals and comprising a polymer having covalently-bound fluorine or silicon.

The invention provides, in another aspect, a method for making a prismatic retroreflective article comprising providing a transparent body portion having an elastic modulus less than about $13 \times 10^8$ pascals, forming thereon a layer of internally reflecting open air-exposed cube-corner optical elements having an elastic modulus greater than about $14 \times 10^8$ pascals and formed at least partly from a polymer having covalently-bound fluorine or silicon, and leaving the cube-corner optical elements exposed to the open air.

These and other aspects of the invention will be apparent from the accompanying drawing and this specification. In no event, however, should the above summaries be construed as limitations on the claimed subject matter, which subject matter is defined solely by the attached claims, as may be amended during prosecution.

BRIEF DESCRIPTION OF THE DRAWING

Like reference symbols in the various drawings indicate like elements. The elements in the drawing are not to scale.

DETAILED DESCRIPTION

Figure 1:
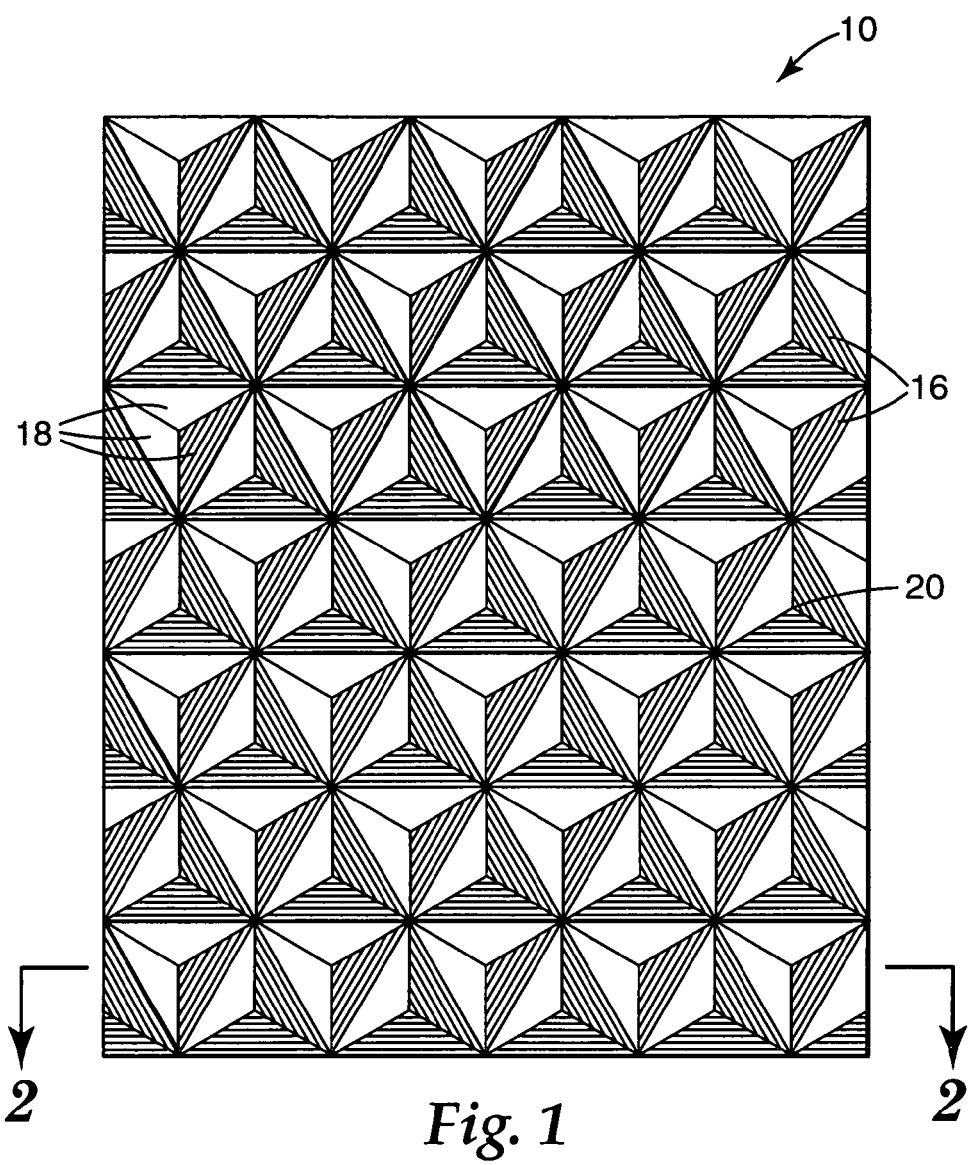
FIG. 1 is a plan view schematic representation of a portion of the open air-exposed cube-corner element rear surfaces in a disclosed cube-corner retroreflective article 10.

The words "a", "an", and "the" are used interchangeably with "at least one" to mean one or more of the elements being described. By using words of orientation such as "atop", "on", "uppermost", "underlying" and the like for the location of various elements in the disclosed articles, we refer to the relative position of an element with respect to a horizontally-disposed, downwardly-facing transparent body portion. We do not intend that the disclosed articles should have any particular orientation in space during or after their manufacture.

The phrases "index of refraction" and "refractive index" refer to a material property representing the ratio of the phase velocity of an electromagnetic wave in a vacuum to that in the material. The word "light" refers to visible radiation. When used in connection with two or more elements in an optical path, the phrase "optical association" means that a significant portion of light transmitted along the path passes through the elements. A "retroreflective" article reflects obliquely incident incoming light in a direction parallel to the incident direction, or nearly so, such that an observer or detector at or near the light source can see or detect the reflected light. A "transparent" retroreflective element has a one-way transmission of at least about 5% (and more preferably at least about 10%, 20% or 50%) in a band at least 100 nm wide in a wavelength region of interest between about 400 nm and about 700 nm, measured along the normal axis. The phrase "internally reflecting" when used with respect to a cube-corner optical element refers to an element that reflects incident light back through the element primarily due to an air interface on the cube-corner element rear surface rather than due to a reflective coating (e.g., a metallized coating, a coating containing a reflective pigment or a stack of coating layers having a refractive index mismatch) on the cube-corner element rear surface.

The phrase "air-encased" when used with respect to a cube-corner element refers to an element having a rear surface in contact with air in a sealed cell. The phrases "open air-exposed" and "exposed to the open air" when used with respect to a cube-corner element refers to an element having a polymeric rear surface in contact with ambient air, and not metallized or encased in a sealed cell.

The word "polymer" includes homopolymers and copolymers, as well as homopolymers or copolymers that may be formed in a miscible blend, e.g., by coextrusion or by reaction, including, e.g., transesterification. The term "copolymer" includes both random and block copolymers. By a "crosslinked" polymer, we mean a polymer in which polymer chains are joined together by covalent chemical bonds, usually via crosslinking molecules or groups, to form a network polymer. A crosslinked polymer is generally characterized by insolubility, but may be swellable in the presence of an appropriate solvent. When used with respect to cube-corner optical elements, the phrase "formed at least partly from a fluorine-containing or silicon-containing polymer" refers to optical elements whose interior contains a polymer having covalently-bound fluorine or silicon, as distinguished from cube-corner optical elements that may merely may contain a mobile, unbound fluorine-containing or silicon-containing species (e.g., a fluorosurfactant or siloxane surfactant) or cube-corner optical elements whose exposed surface may merely bear a topical fluorine-containing or silicon-containing coating.

FIG. 1 shows a portion of a retroreflective article 10 having a plurality of cube-corner elements 16, each defined by three open-air exposed planar facets 18 arranged to form a trihedral pyramidal prism. The cube-corner optical elements 16 are disposed as matched pairs in an ordered array on one side of the sheeting and are shown to protrude out of the page of the drawing. The planar facets 18 may for example be substantially perpendicular to one another (as in the corner of a room). The angle between the facets 18 typically is the same for each cube-corner element in the array and is about 90°. The angle may however deviate from 90° as described, for example, in U.S. Pat. No. 4,775,219. Although the apex 20 of each cube-corner element 16 may be vertically aligned with the center of the cube-corner element base as described, for example, in U.S. Pat. No. 3,684,348, the apex also may be canted as described, for example, in U.S. Pat. No. 4,588,258. Thus, the disclosed invention is not limited to any particular cube-corner geometry and any of the geometries now known or hereafter developed may be employed.

Figure 2:
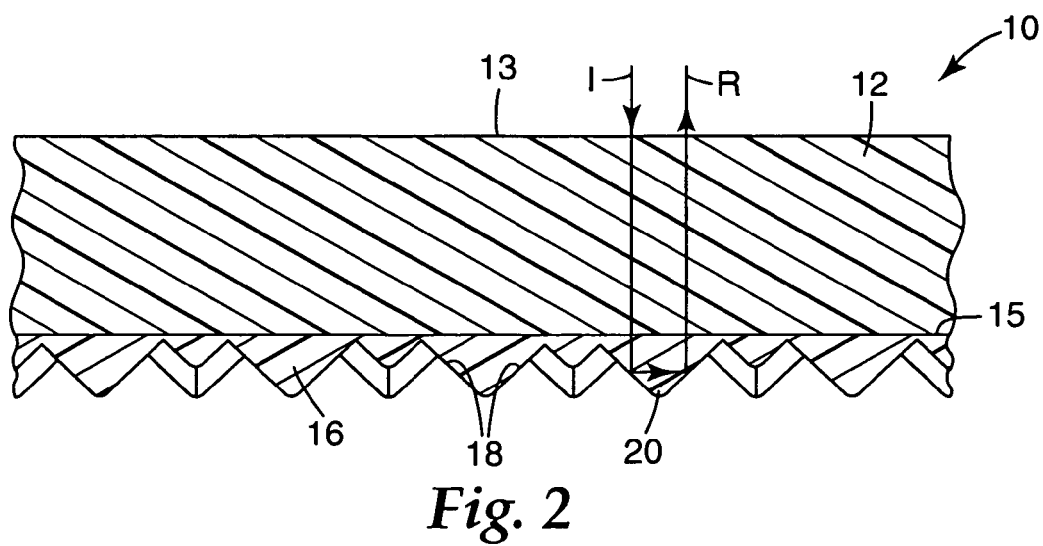
FIG. 2 is a cross-sectional representation of the cube-corner retroreflective article 10 taken along line 2-2.

FIG. 2 shows a cross-sectional representation of retroreflective article 10 taken along line 2-2 of FIG. 1. Retroreflective article 10 has a body portion 12 having front or incident surface 13 and rear surface 15. Body portion 12 has an elastic modulus less than about $13 \times 10^8$ pascals. A layer of internally reflecting cube-corner optical elements 16 project from rear surface 15 and are in optical association with body portion 12. The rear surfaces of the facets 18 are exposed to the open air. Cube-corner optical elements 16 have an elastic modulus greater than about $14 \times 10^8$ pascals and are formed at least partly from a polymer having covalently-bound fluorine or silicon. The presence of fluorine or silicon atoms in the polymer reduces retroreflectivity loss when the elements 16 are exposed to one or both of water or oil, e.g., by discouraging adhesion and spreading of drops of water or oil that may come into contact with the cube-corner optical elements 16. Cube-corner optical elements 16 desirably have a sufficiently low surface energy so that water, mineral oil or both water and mineral oil will bead up rather than spreading when applied to elements 16. Desirably when the rear surface of article 10 is exposed to rainfall or other liquids, incident light I can enter body portion 12 through front side 13, pass into cube-corner optical elements 16, reflect off cube-corner facets 18 and be redirected in the general direction of the incident beam, as indicated by reflected light beam R.

The body portion 12 may be made from a variety of suitably flexible, suitably light transmissible polymeric materials. Materials described as "overlay films" in the above-mentioned U.S. Pat. No. 5,691,846 are preferred. For example, body portion 12 may desirably be made from plasticized polyvinyl chloride films, aliphatic or aromatic polyurethane films, ionomeric ethylene copolymer films, low density polyethylene films, polyethylene copolymer films (e.g., acid-functional or acrylic-functional polymer films) or combinations thereof.

The cube-corner optical elements 16 may be made from a variety of suitably rigid light transmissible polymeric materials. For example, the cube-corner optical elements 16 may be made entirely from a fluoropolymer. Fluoropolymers have previously been said to be usable in body layer films for retroreflective sheeting (see e.g., U.S. Pat. No. 3,684,348) and in metallized or encapsulated cube-corner optical elements (see e.g., U.S. Pat. No. 6,258,443 B1), but do not appear to have been employed to make open air-exposed cube-corner optical elements. The cube-corner optical elements 16 may also be made entirely from a siloxane polymer. Polymers having "hard" segments and "soft" polysiloxane segments have previously been used to make monolithic retroreflective sheeting (see e.g., U.S. Pat. No. 4,668,558), but do not appear to have been employed to make open air-exposed cube-corner optical elements in retroreflective articles having a lower modulus transparent body portion and higher modulus cube-corner optical elements. The cube-corner optical elements 16 may also be made from a variety of other thermoplastic or thermoset materials (e.g., polymethyl methacrylate, polycarbonate, polyurethanes, unplasticized polyvinyl chlorides and epoxy acrylates) to which may be added a fluorine- or silicon-containing polymeric melt additive, or a copolymerizable fluorine- or silicon-containing monomer, oligomer or polymer, prior to cube formation. Persons skilled in the art will recognize that other approaches may be employed to form the disclosed retroreflective articles from cube-corner optical elements formed at least partly from a polymer having covalently-bound fluorine or silicon.

Representative fluorine-containing or silicon-containing materials that may be used by themselves or as an additive to a thermoplastic or thermoset resin (viz., a "cube resin") from which the cube-corner optical elements will be formed include fluorine-containing and silicon-containing acrylates and methacrylates (e.g., perfluoroalkyl acrylates and methacrylates such as methylperfluorobutylsulfonamido ethyl acrylate, methylperfluorobutylsulfonamido ethyl methacrylate and oligomers of the formula:

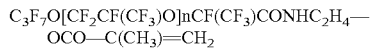

where n may be, for example, 6 to 7; polydimethylsiloxane acrylates and methacrylates such as polyether-modified polydimethyl siloxane acrylate and polyether-modified polydimethyl siloxane methacrylate); and polyether-modified polydimethyl siloxanes.

Figure 3:
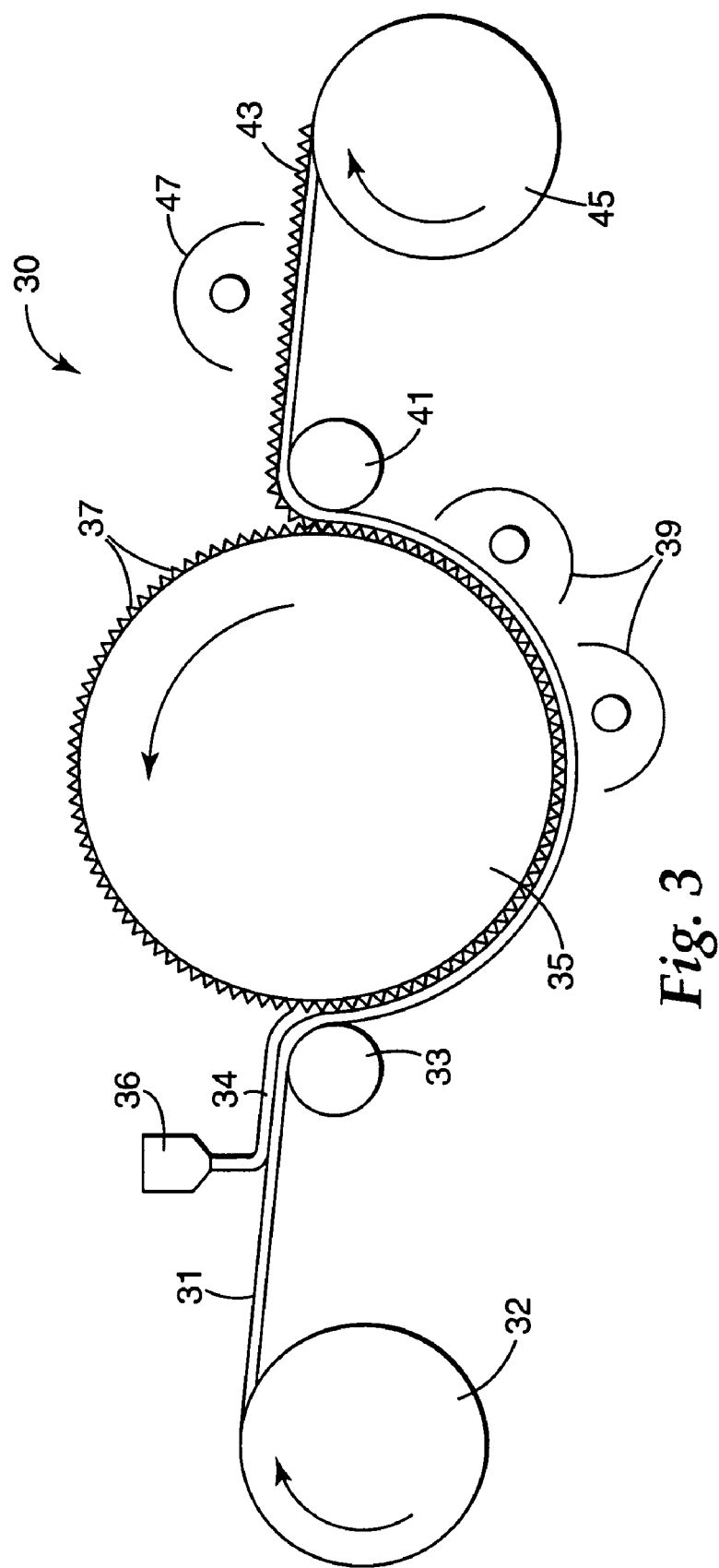
FIG. 3 is a schematic representation of an illustrative apparatus for practicing the disclosed method.
Figure 4:
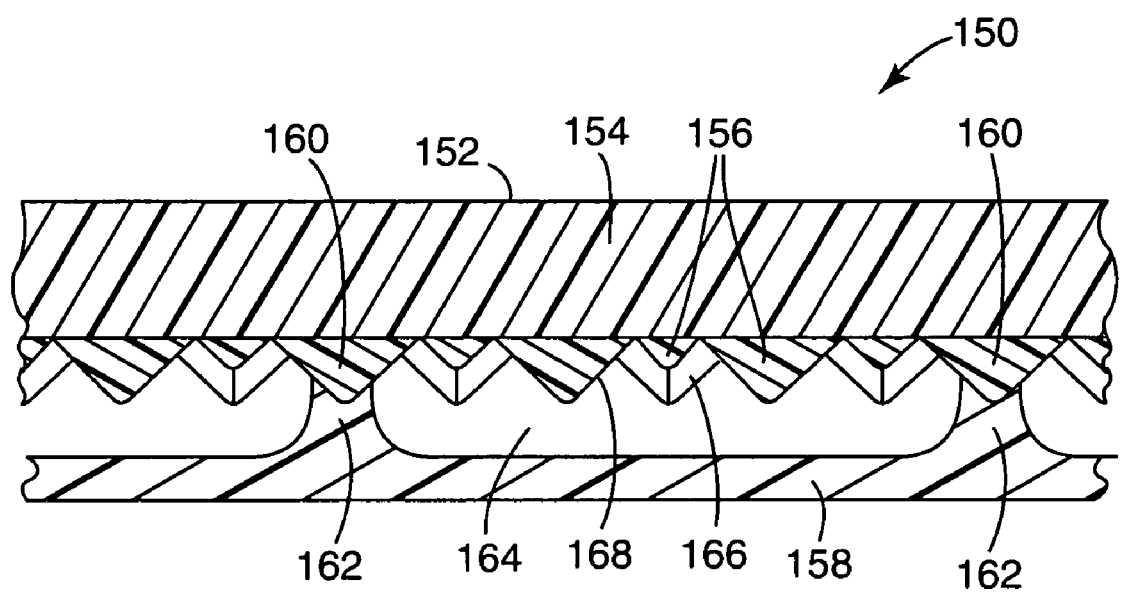
FIG. 4 is a cross-sectional representation of a prior art prismatic retroreflective article having cube-corner optical elements encased in sealed cells by a rear cover film.

FIG. 3 is a schematic representation of an apparatus, shown generally as 30, for casting and curing retroreflective articles (in the form of continuous retroreflective sheeting) according to the disclosed method. As shown in FIG. 3, flexible body layer film 31 is drawn from supply reel 32. Higher modulus fluorine- or silicon-containing cube resin 34 is applied to the upper surface of lower modulus body film 31 from coating die 36. Body film 31 and its applied cube resin layer are pushed by rubber-covered nip roller 33 against patterned tool roll 35. The cube resin thickness, if any, extending above the cube-corner element forming cavities 37 in tool roll 35 may be adjusted by setting the nip width or nip pressure at nip roller 33. For example, the nip may be set to minimize or eliminate the extending resin thickness, thereby promoting fracturing of the land portion between individual cube-corner optical elements in the completed retroreflective sheeting. This fracturing can decouple the individual cube-corner elements from their surrounding neighbors and can make the completed retroreflective sheeting more flexible.

A molded thermoplastic cube resin may be cooled using a variety of approaches that will be familiar to those skilled in the art (e.g., a chilled patterned tool roll) to form the completed cube-corner elements. A thermoset cube resin may be cured in one or more steps using a variety of approaches that will be familiar to those skilled in the art (e.g., by exposure to a suitable radiation source such as electron beam exposure; actinic radiation such as ultraviolet radiation, visible light radiation or infrared radiation; or other suitable energy sources depending upon the nature of the cube resin) to form the completed cube-corner elements. For example, one or more first radiation sources 39 may be employed to irradiate a thermoset cube resin through body layer film 31 while the cube resin is embedded in the cavities 37. This first or primary curing step can essentially completely cure the cube-corner optical elements, or may merely partially cure the cube resin to a degree such that the cube-corner optical elements are dimensionally stable and no longer require support from tool roll 35. The sheeting can then be removed from tool roll 35 at roller 41 to expose the cube-corner elements, and the completed retroreflective sheeting 43 may be wound up at take-up reel 45.

One or more secondary curing treatments, selected depending upon the nature of the cube resin, can optionally be employed to further cure the array of cube-corner optical elements and strengthen their bond to the body layer film. This bifurcated curing approach can permit optimized processes and materials. For example retroreflective sheeting having a body layer containing ultraviolet absorbers (to impart greater durability and weathering ability) can be made by applying a primary curing treatment of visible light through the transparent body layer film using radiation sources 39, then removing the sheeting from tool roll 35 and applying a second curing treatment of ultraviolet radiation to the exposed cube-corner elements using optional second radiation source 47.

Body layer film 31 may be optionally supported during casting and curing by a suitable carrier film (not shown in FIG. 3) that provides structural and mechanical durability to body layer film 31 and which is stripped from body layer film 31 before the completed retroreflective sheeting 43 is wound up at take-up reel 45. Use of such a carrier film is particularly preferred for low modulus body layer films.

The disclosed method may also employ heat treatment after the retroreflective sheeting is removed from tool roll 35. Such heating serves to relax stresses that might have developed in the body layer film or cube-corner optical elements, and to drive off unreacted moieties and by-reaction products. Typically, such treatment involves heating the sheeting to an elevated temperature, e.g., above the cube resin glass transition temperature.

The completed retroreflective article may be employed as is or mounted on a suitable support that leaves the cube-corner optical elements exposed to the open air. A variety of supports may be used and will be familiar to those skilled in the art. Representative supports include woven, nonwoven or knit fabrics (e.g., as used in garments and footwear), plastics, leather, metals, tile, concrete, masonry and wood. A variety of mounting techniques may be employed and will be familiar to those skilled in the art. Representative mounting techniques include sewing, adhesives, welding (e.g., sonic welding) and fasteners (e.g., rivets).

The invention is further illustrated in the following illustrative examples, in which all parts and percentages are by weight unless otherwise indicated.

EXAMPLE 1

A control cube resin was formed from 24.75 parts EBECRYL™ 3700 bisphenol A epoxy diacrylate (UCB Chemicals, Inc.), 49.5 parts trimethylolpropane triacrylate, 24.75 parts hexanediol diacrylate and 1 part DAROCURE™ 4265 photoinitiator (Ciba Specialty Chemicals, Inc.). A modified cube resin was prepared by adding 3 parts of BYK™ UV3510 polyether-modified polydimethyl siloxane (Byk-Chemie USA, Inc.) to 97 parts of the control cube resin. A 0.25 mm thick plasticized clear polyvinyl chloride body layer film (No. KGC193 from Achilles USA, Inc.) having a 3.5 hand value and an elastic modulus less than about $10^8$ pascals was mounted in an apparatus like that shown in FIG. 3. The control and modified cube resins were UV-cured against the body layer film to form unsealed retroreflective sheeting having 0.9 mm high open air-exposed cube-corner optical elements. The cube side of the control sheeting was exposed to water, which wet out the cube-corner optical element rear surfaces and significantly decreased retroreflectivity. When the modified cube resin sheeting was exposed to water, it did not wet out the cube-corner optical elements. Instead the applied water beaded up, minimizing the area in contact with the liquid and largely preserving retroreflectivity. These tests were repeated using mineral oil, kerosene, mineral spirits and isopropanol, all of which were found to wet out both the control and modified sheeting.

EXAMPLE 2

Using the method of Example 1, a modified cube resin was prepared by adding 3 parts of the copolymerizable material BYK™ UV3500 polyether-modified polydimethyl siloxane acrylate (Byk-Chemie USA, Inc.) to 97 parts of the control cube resin. The modified cube resin was UV-cured against the body layer film to form unsealed retroreflective sheeting having 0.9 mm high open air-exposed cube-corner optical elements. When the modified cube resin sheeting was exposed to water, it did not wet out the cube-corner optical elements. Instead the applied water beaded up, minimizing the area in contact with the liquid and largely preserving retroreflectivity. These tests were repeated using mineral oil, kerosene, mineral spirits and isopropanol, all of which were found to wet out the modified sheeting.

EXAMPLE 3

Using the method of Example 1, four modified cube resins were prepared by adding 10 parts or 25 parts of the copolymerizable materials methylperfluorobutylsulfonamido ethyl acrylate or methylperfluorobutylsulfonamido ethyl methacrylate to 90 parts or 75 parts of the control cube resin. The modified cube resins were UV-cured against the body layer film to form four unsealed retroreflective sheetings having 0.9 mm high open air-exposed cube-corner optical elements. Water did not wet out the cube-corner optical elements. Instead the applied water beaded up, minimizing the area in contact with the liquid and largely preserving retroreflectivity. These tests were repeated using mineral oil, kerosene, mineral spirits and isopropanol, all of which were found to wet out the modified sheetings.

The control and modified sheetings were each stitched to a lightweight polyester knit fabric used in safety vests, then subjected to a water shower test and measured for retroreflectivity according to Annex D ("Method of measuring wet retroreflective performance") of European Standard EN-471 ("High visibility warning clothing for professional use— Test methods and requirements"). The samples were next laundered according to ISO 6330 ("Textiles—Domestic washing and drying procedures for textile testing"), using a 60° C. wash cycle followed by a 50° C. drying cycle, then remeasured for retroreflectivity. The samples were subjected to four additional 60° C. wash cycles followed by one 50° C. drying cycle (thus bringing to five the total number of wash cycles) and a further retroreflectivity measurement was taken. The retroreflectivity results were expressed as a fraction calculated as follows:

Performance Improvement=((Modified−Control)/ Control)×100

Cube-corner optical element elastic modulus values were determined using nanomechanical analysis. The retroreflectivity after laundering and elastic modulus results are set out below in Table I:

TABLE I

| | | Retroreflectivity Performance Improvement vs. Control After Laundering Wash Cycles | | | |
|---|---|---|---|---|---|
| Run No. | Cube Resin Additive | Initial (0) | 1 | 5 | Elastic Modulus |
| Control | None | — | — | — | 32 × 10⁸ pascals |
| 3-1 | 10% methylperfluorobutyl-sulfonamido ethyl acrylate | +22% | +134% | −18% | 30 × 10⁸ pascals |
| 3-2 | 25% methylperfluorobutyl-sulfonamido ethyl acrylate | +86% | +86% | 0 | 26 × 10⁸ pascals |
| 3-3 | 10% methylperfluorobutyl-sulfonamido ethyl methacrylate | +17% | +218% | +10% | 28 × 10⁸ pascals |
| 3-4 | 25% methylperfluorobutyl-sulfonamido ethyl methacrylate | +38% | +58% | −17% | 24 × 10⁸ pascals |

All samples showed improved performance compared to the unmodified control after one laundering. The Run 3-3 sample also showed improved performance compared to the unmodified control after five launderings.

All references cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the invention is not to be limited only by the claims provided below.

I claim:

1. A prismatic retroreflective article comprising
a transparent polymeric body portion having an elastic modulus less than about 13×10⁸ pascals, and a layer of internally reflecting open air-exposed cube-corner optical elements having an elastic modulus greater than about $14\times10^8$ pascals and comprising a crosslinked polymer having covalently-bound fluorine or silicon.

2. A retroreflective article according to claim 1, wherein the cube-corner optical elements comprise a fluoropolymer.

3. A retroreflective article according to claim 2, wherein the cube-corner optical elements comprise a perfluoroalkyl acrylate or methacrylate polymer or copolymer.

4. A retroreflective article according to claim 1, wherein the cube-corner optical elements comprise a polysiloxane.

5. A retroreflective article according to claim 4, wherein the cube-corner optical elements comprise a polyether-modified polydimethyl siloxane acrylate or methacrylate polymer or copolymer.

6. A retroreflective article according to claim 1, wherein water or mineral oil will bead up rather than spreading when applied to the cube-corner optical elements.

7. A retroreflective article according to claim 1, wherein water and mineral oil will bead up rather than spreading when applied to the cube-corner optical elements.

8. A retroreflective article according to claim 1, further comprising a support on which the retroreflective article is mounted while leaving the cube-corner optical elements exposed to the open air.

9. A retroreflective article according to claim 8, wherein the support comprises a fabric.

10. A method for making a prismatic retroreflective article comprising
    providing a transparent body portion having an elastic modulus less than about $13\times10^8$ pascals,
    forming thereon a layer of internally reflecting open air-exposed cube-corner optical elements having an elastic modulus greater than about $14\times10^8$ pascals and comprising a crosslinked polymer having covalently-bound fluorine or silicon, and
    leaving the cube-corner optical elements exposed to the open air.

11. A method according to claim 10, comprising forming the cube-corner optical elements from a polymerizable resin mixture comprising a copolymerizable fluorine-containing monomer, oligomer or polymer.

12. A method according to claim 11, wherein the polymerizable resin mixture comprises a perfluoroalkyl acrylate or methacrylate.

13. A method according to claim 12, wherein the perfluoroalkyl acrylate or methacrylate comprises methylperfluorobutylsulfonamido ethyl acrylate or methacrylate.

14. A method according to claim 10, comprising forming the cube-corner optical elements from a polymerizable resin mixture comprising a copolymerizable silicon-containing monomer, oligomer or polymer.

15. A method according to claim 14, wherein the polymerizable resin mixture comprises a polyether-modified polydimethyl siloxane.

16. A method according to claim 14, wherein the polymerizable resin mixture comprises a polyether-modified polydimethyl siloxane acrylate or methacrylate.

17. A method according to claim 10, further comprising mounting the retroreflective article on a support while leaving the cube-corner optical elements exposed to the open air.

18. A method according to claim 17, wherein the support comprises a fabric.

19. A prismatic retroreflective article comprising:
    a transparent polymeric body portion having an elastic modulus less than about $13\times10^8$ pascals, and
    a layer of internally reflecting open air-exposed cube-corner optical elements having an elastic modulus greater than about $14\times10^8$ pascals and comprising a crosslinked polymer having covalently-bound fluorine or silicon,
    wherein the cube-corner optical elements comprise at least one of:
        a perfluoroalkyl acrylate or methacrylate polymer or copolymer, and
        a polyether-modified polydimethyl siloxane acrylate or methacrylate polymer or copolymer, and wherein water or mineral oil will bead up rather than spreading when applied to the cube-corner optical elements.

* * * * *